United States Patent
Fu et al.

(10) Patent No.: US 11,205,943 B1
(45) Date of Patent: *Dec. 21, 2021

(54) TWO-STATOR AND TWO-ROTOR COMBINED ENERGY-SAVING MOTOR

(71) Applicant: Shenzhen Yiji Manufacturing Co., Ltd., Shenzhen (CN)

(72) Inventors: Zhenqiang Fu, Shenzhen (CN); Zhaohong Zheng, Shenzhen (CN)

(73) Assignee: Shenzhen Yiji Manufacturing Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/072,915

(22) Filed: Oct. 16, 2020

(30) Foreign Application Priority Data

May 29, 2020 (CN) ......................... 202010480056.7

(51) Int. Cl.
*H02K 16/00* (2006.01)
*H02K 16/04* (2006.01)

(52) U.S. Cl.
CPC ............. *H02K 16/00* (2013.01); *H02K 16/04* (2013.01)

(58) Field of Classification Search
CPC ........ H02K 1/141; H02K 1/143; H02K 1/148; H02K 1/14; H02K 16/00; H02K 16/02; H02K 16/04; H02K 2201/06
USPC ......................................... 310/112, 113, 114
See application file for complete search history.

(56) References Cited

U.S. PATENT DOCUMENTS

| | | | |
|---|---|---|---|
| 6,590,312 B1* | 7/2003 | Seguchi | B60L 15/2009 310/266 |
| 2002/0163270 A1* | 11/2002 | Almada | H02K 1/278 310/156.47 |
| 2006/0131985 A1* | 6/2006 | Qu | H02K 1/14 310/266 |
| 2008/0036215 A1* | 2/2008 | Gizaw | H02K 29/03 290/55 |
| 2009/0278415 A1* | 11/2009 | Park | H02K 16/00 310/156.08 |
| 2010/0139999 A1* | 6/2010 | Park | H02K 16/02 180/65.51 |
| 2010/0171451 A1* | 7/2010 | Quere | H02K 16/00 318/400.09 |
| 2012/0286616 A1* | 11/2012 | Li | H02K 21/029 310/191 |

(Continued)

FOREIGN PATENT DOCUMENTS

GB 2459061 A * 10/2009 ............. H02K 1/148

*Primary Examiner* — Quyen P Leung
*Assistant Examiner* — Eric Johnson
(74) *Attorney, Agent, or Firm* — Getech Law LLC; Jun Ye (57) ABSTRACT

The present invention discloses a new two-stator and two-rotor combined energy-saving motor, which relates to the technical field of motor. The motor comprises a motor shell, two rotors and two stators, wherein the stators and the rotors are arranged in the motor shell, each rotor comprises an outer rotor part, an inner rotor part and a flange, the outer rotor part is arranged outside the cylindrical inner rotor part, the outer rotor part and the inner rotor part are connected by flange; an inner stator zone is formed between the outer rotor part and the inner rotor part, and one of the stators is arranged in the inner stator zone of the rotor; an outer stator zone is formed between the outer rotor part and the motor shell, and the other of the stator is arranged in the outer stator zone.

5 Claims, 9 Drawing Sheets

(56) References Cited

U.S. PATENT DOCUMENTS

2016/0322873 A1* 11/2016 Udo ................. H02K 1/278
2016/0376741 A1* 12/2016 Kim ................. H02K 1/148
                                                      310/90
2018/0109169 A1* 4/2018 Chi-Hsueh ............ F01N 3/08

* cited by examiner

TWO-STATOR AND TWO-ROTOR COMBINED ENERGY-SAVING MOTOR

TECHNICAL FIELD

The present invention relates to the technical field of motor, and in particular, to a new two-stator and two-rotor combined energy-saving motor.

BACKGROUND ART

According to the rotor position, traditional permanent magnet motors can be divided into internal rotor motor and external rotor motor, wherein the rotor is arranged in the circular zone of stators in an internal rotor motor, and the rotor is arranged outside the stators in an external rotor motor. In a traditional permanent magnet motor, after the winding on the stator is energized, the windings on the stator are energized and switched automatically under the action of magnetic induction hall or magnetic induction coil, which generates a rotating magnetic field of magnetic induction line and drives the rotor to rotate.

When the stator of a traditional permanent magnet motor is energized, only the magnetic field on one side generated by the winding has an effect on the rotor, while the magnetic field on the other side cannot have an effect on the rotor, which causes energy waste.

SUMMARY

To overcome the defects in existing technologies, the technical problem to be resolved by the present invention: how to utilize the magnetic field at both sides of the stator winding to drive the rotor to rotate.

For this purpose, the present invention adopts the following technical scheme:

The new two-stator and two-rotor combined energy-saving motor comprises a motor shell, two rotors and two stators, wherein the stators and the rotors are arranged in the motor shell; the stator comprises a plurality of circularly distributed stator cores, and the stator cores are wound with magnetic induction lines passing through the coils at both radial sides of the stator core; the rotor comprises an outer rotor part, an inner rotor part and a flange; the outer rotor part is arranged outside the cylindrical inner rotor part, and the outer rotor part and the inner rotor part are connected by flange; an inner stator zone is formed between the outer rotor part and the inner rotor part, and one of the stators is arranged in the inner stator zone of the rotor; an outer stator zone is formed between the outer rotor part and the motor shell, and the other of the stators is arranged in the outer stator zone; the inner side of the outer rotor part and the outer side of the inner rotor part are provided with a plurality of circularly distributed permanent magnet modules, and two adjacent permanent magnet modules have opposite polarity.

Beneficially or exemplarily, the stator cores of the stator in the outer stator zone are fixed onto the inner surface of the motor shell.

Beneficially or exemplarily, the stator further comprises a fixing ring, wherein the stator cores are circularly distributed on the fixing ring, the stator further comprises a fixing support, and the fixing support is used for fixing the stator cores to the fixing ring; the stator core is in an I-shaped structure and comprises a first arch part, a second arch part and a middle part, the first arch part and the second arch part are connected by the middle part, and the coils are wound on the middle part with slots at both sides; a fixing hole of the first arch part vertically runs through the first arch part, and the fixing support is fixedly connected to the fixing ring after passing through the fixing hole; the stator cores of the stator in the inner stator zone are configured as: the first arch part faces towards the outer rotor part, and the second arch part faces towards the inner rotor part.

Beneficially or exemplarily, each of the permanent magnet modules comprises a plurality of permanent magnets, wherein the permanent magnets of the permanent magnet module of the inner rotor part are vertically mounted along the outer side of the inner rotor part, and the permanent magnets of the permanent magnet module of the outer rotor part are inclinedly mounted along the inner side of the outer rotor part.

Beneficially or exemplarily, the permanent magnets of the permanent magnet module of the inner rotor part are inclinedly mounted along the outer side of the inner rotor part, and the permanent magnets of the permanent magnet module of the outer rotor part are vertically mounted along the inner side of the outer rotor part.

Beneficially or exemplarily, the angle of inclination of the permanent magnets inclinedly mounted is 5 to 15 degrees.

Beneficially or exemplarily, the permanent magnet modules of the inner rotor part and the outer rotor part have opposite positions and same quantity, and the permanent magnet modules at the opposite positions of the inner rotor part and the outer rotor part have opposite polarity facing towards the stator zone.

Beneficially or exemplarily, the permanent magnets of the permanent magnet module of the inner rotor part are vertically mounted along the outer side of the inner rotor part, and the permanent magnets of the permanent magnet module of the outer rotor part are vertically mounted along the inner side of the outer rotor part.

Beneficially or exemplarily, it further comprises a rotating shaft, connected to the inner rotor part, connected to the frontend cover through rotation of a bearing after passing through the frontend cover; the stators, arranged on the frontend cover.

The beneficial effects of the present invention are:

By designing the structure of the stators and the rotors, the present invention makes full use of the magnetic field on both sides of the inner stator zone and the inner rotor part and the outer rotor part, and the output power of the motor is equal to the sum of the powers of the inner rotor part and the outer rotor part, making full use of the magnetic field on both sides of the stator, which avoids energy waste.

In addition, the present invention also makes full use of the internal space of the motor, and sets another stator between the outer rotor part and the motor shell, so that the magnetic fields on both sides of the permanent magnet module 35 of the outer rotor part can also be utilized, which further improves the overall output power of the motor.

Under the above two kinds of energy saving effects, compared with the traditional motor, under the condition of reaching the same power, the number of winding sets used in the present invention is significantly reduced, which reduces stator size, uses fewer winding materials, and realizes higher economic benefit.

10—motor shell; 20—stator; 21—fixing ring; 22—stator core; 221—the first arch part; 222—the second arch part; 223—middle part; 224—fixing hole; 23—coil; 24—fixing support; 30—rotor; 31—outer rotor part; 32—inner rotor part; 33—flange; 34—rotating shaft; 35—permanent magnet module; 36—inner stator zone; 37—outer stator zone; 40—frontend cover; 50—rear end cover.

DETAILED DESCRIPTION

Figure 1:
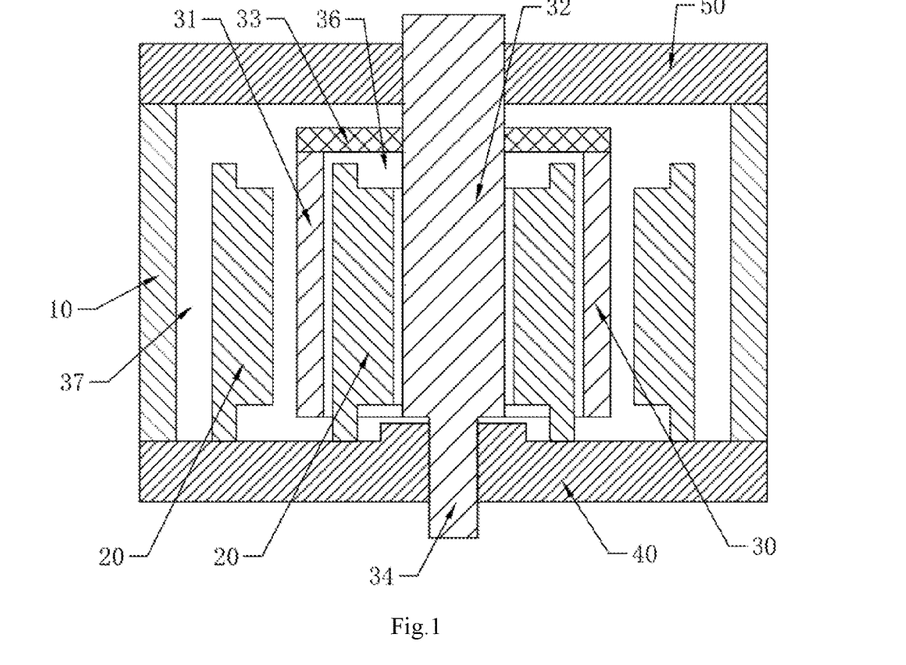
FIG. 1 is a sectional view of the structure of a new two-stator and two-rotor combined energy-saving motor in an embodiment of the present invention.
Figure 2:
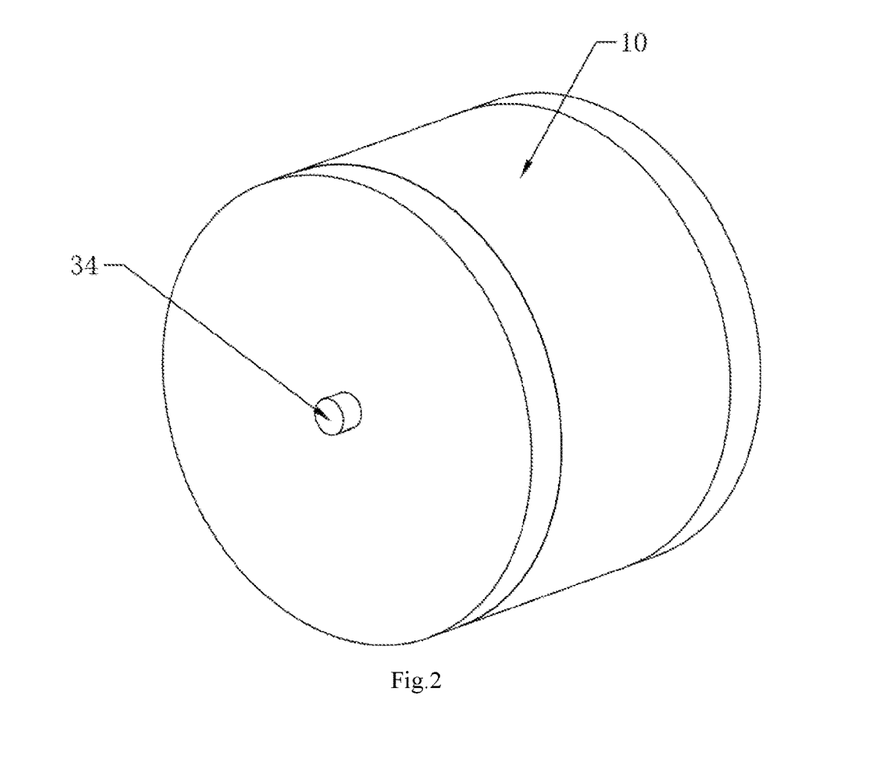
FIG. 2 is a stereogram of the structure of a new two-stator and two-rotor combined energy-saving motor in an embodiment of the present invention
Figure 3:
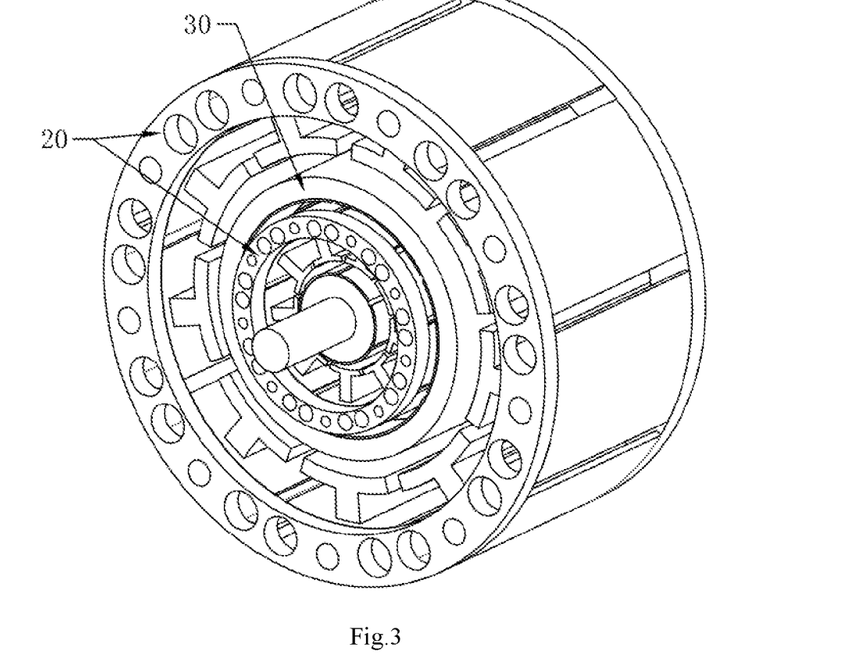
FIG. 3 is a matching view of two stators and rotor of a new two-stator and two-rotor combined energy-saving motor in an embodiment of the present invention
Figure 4:
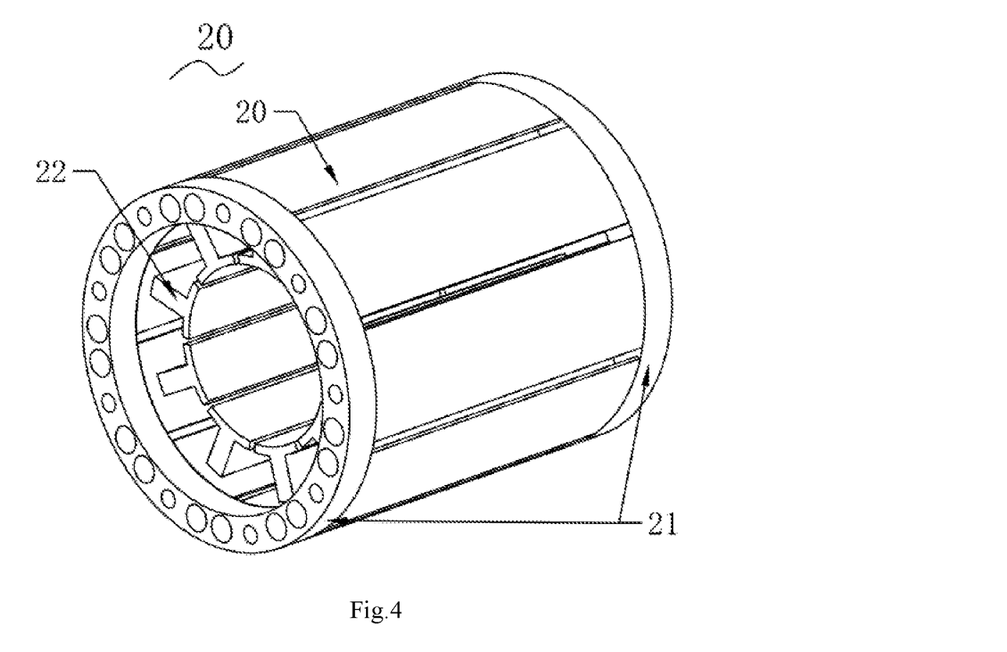
FIG. 4 is the structural diagram of the stator of a new two-stator and two-rotor combined energy-saving motor in an embodiment of the present invention
Figure 5:
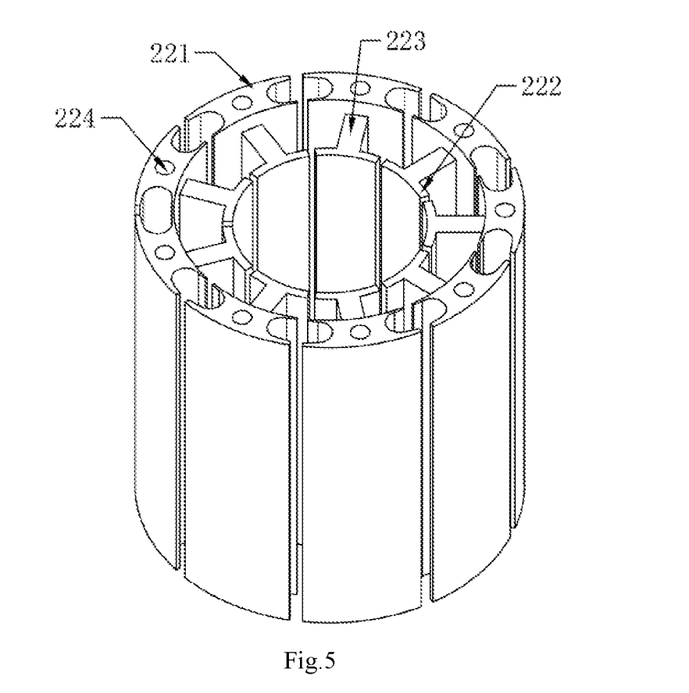
FIG. 5 is a schematic diagram of stator core distribution of a new two-stator and two-rotor combined energy-saving motor in an embodiment of the present invention
Figure 6:
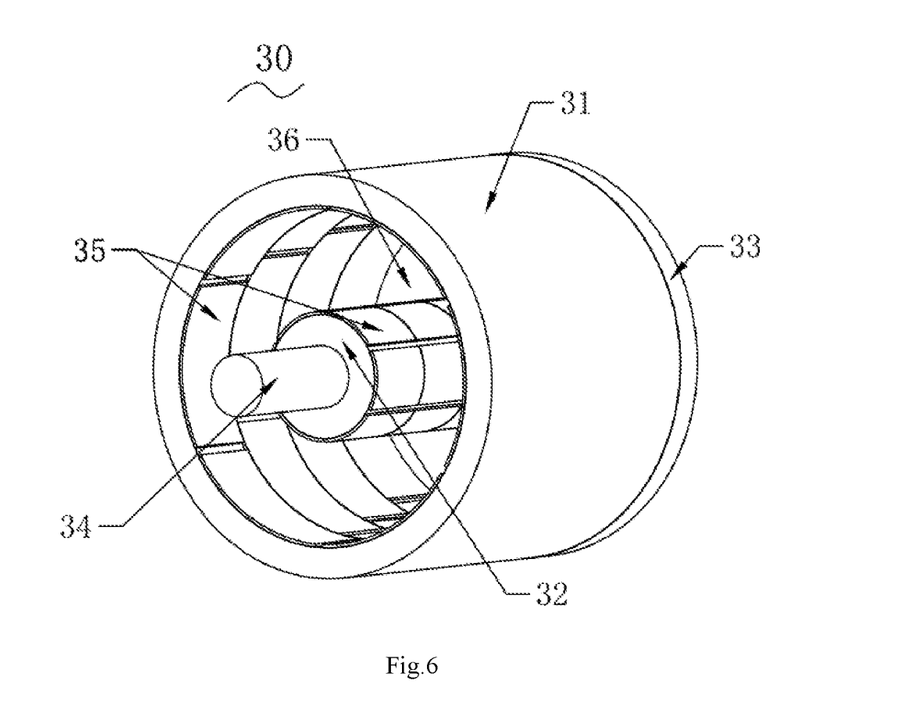
FIG. 6 is the structural diagram of the rotor of a new two-stator and two-rotor combined energy-saving motor in an embodiment of the present invention
Figure 7:
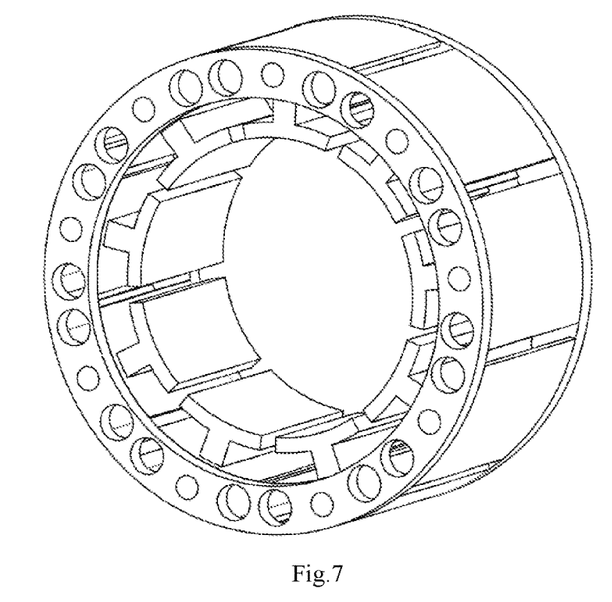
FIG. 7 is the structural diagram of the stator of the outer stator zone of a new two-stator and two-rotor combined energy-saving motor in an embodiment of the present invention
Figure 8:
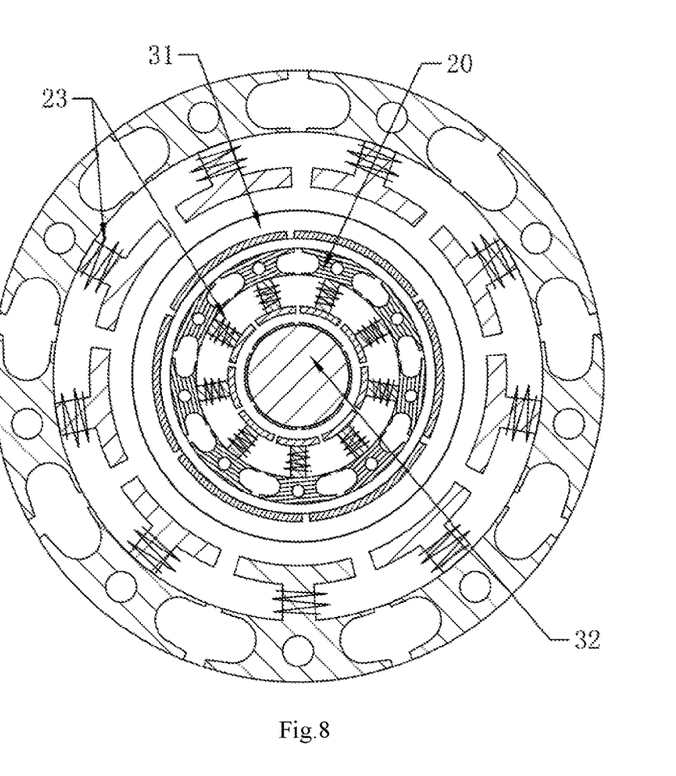
FIG. 8 is a sectional view of the stator and rotor of a new two-stator and two-rotor combined energy-saving motor in an embodiment of the present invention
Figure 9:
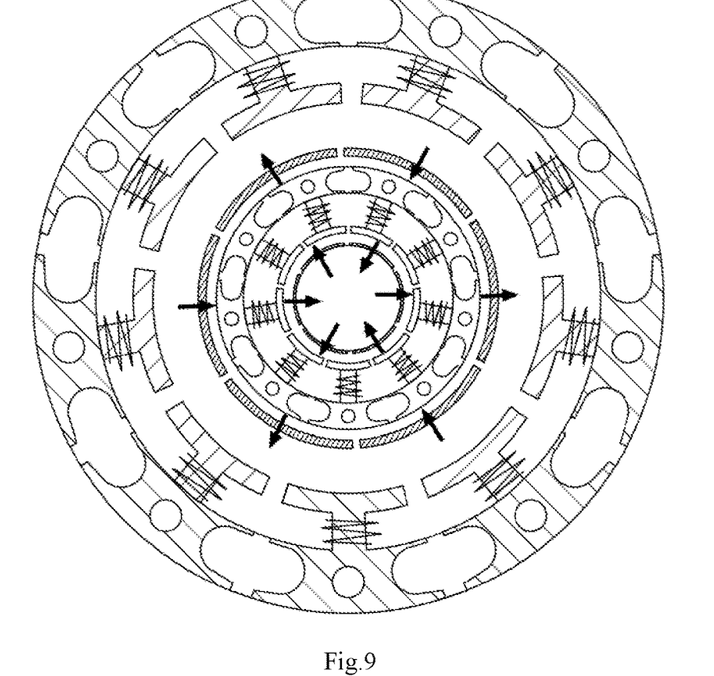
FIG. 9 is the directional diagram of the magnetic induction line of the permanent magnet modules of the inner rotor part and the outer rotor part of a new two-stator and two-rotor combined energy-saving motor in an embodiment of the present invention
Figure 10:
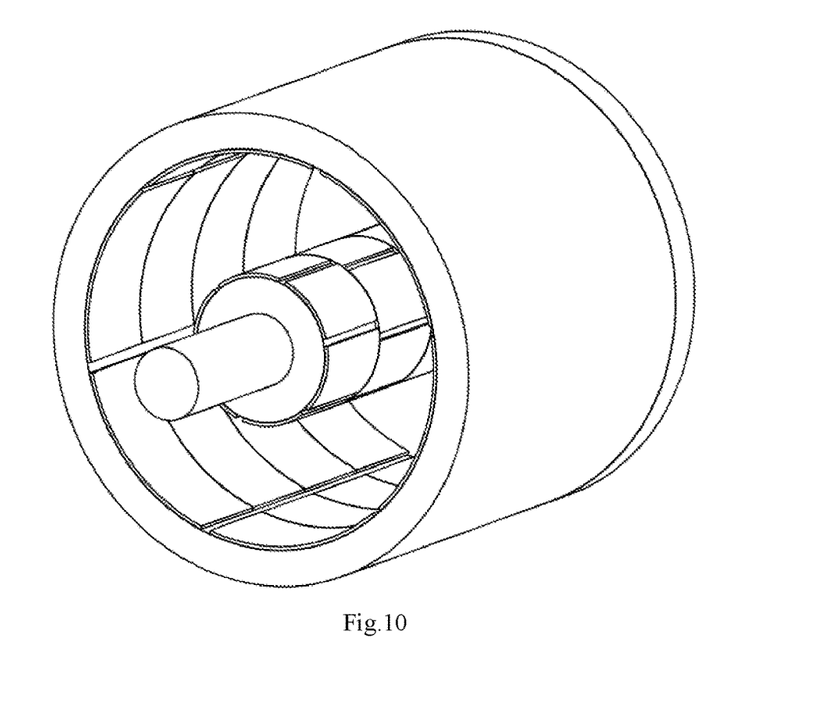
FIG. 10 is the structural diagram of the rotor of a new two-stator and two-rotor combined energy-saving motor in an embodiment of the present invention
Figure 11:
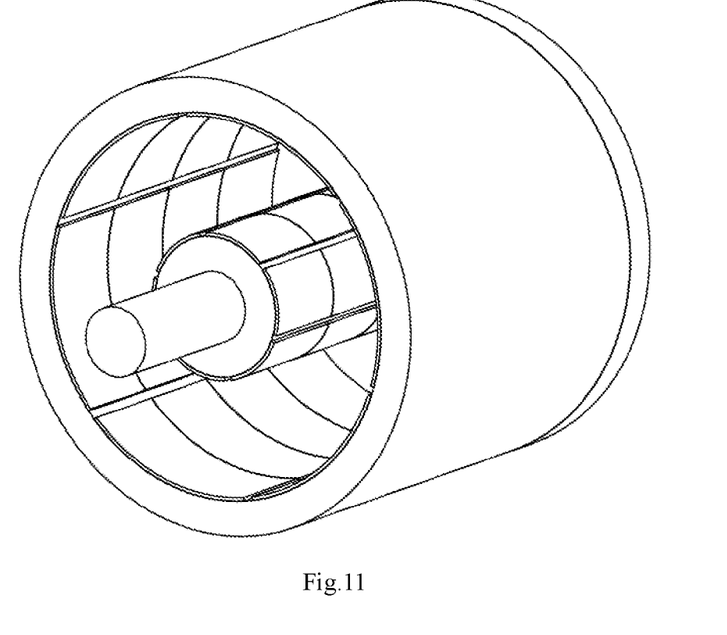
FIG. 11 is the structural diagram of the rotor of a new two-stator and two-rotor square-wave permanent magnet energy-saving motor in an embodiment of the present invention
Figure 12:
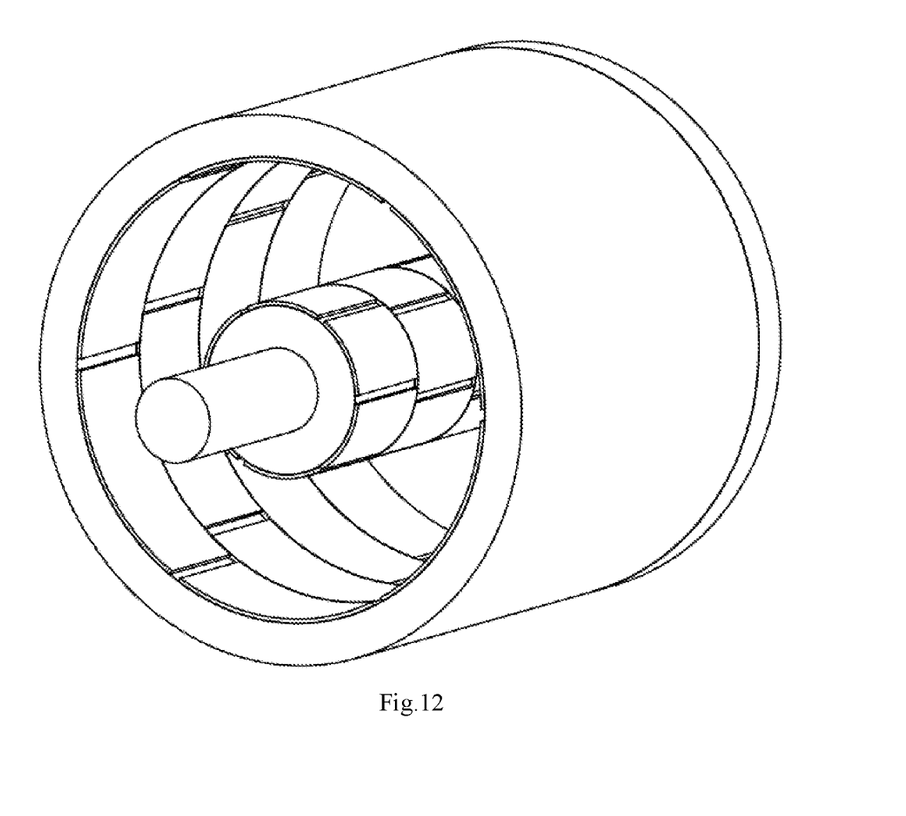
FIG. 12 is the structural diagram of the rotor of a new two-stator and two-rotor sinusoidal-wave permanent magnet energy-saving motor in an embodiment of the present invention
Figure 13:
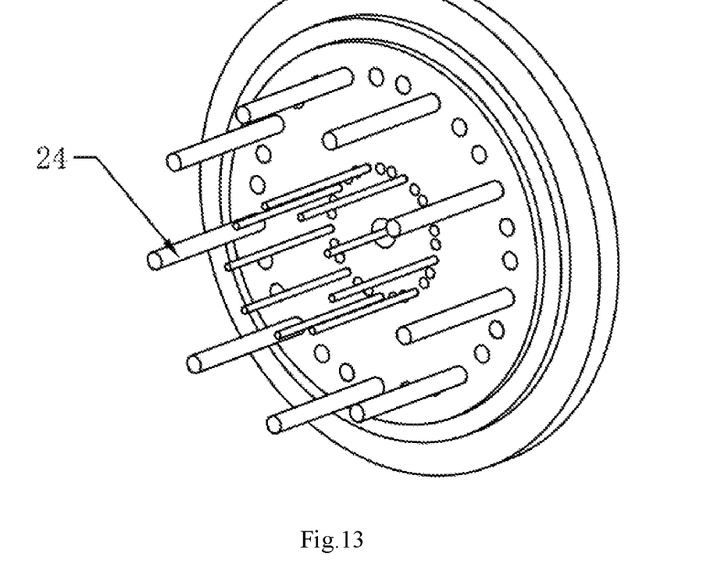
FIG. 13 is the structural diagram of the frontend cover of a new two-stator and two-rotor combined energy-saving motor in an embodiment of the present invention
Figure 14:
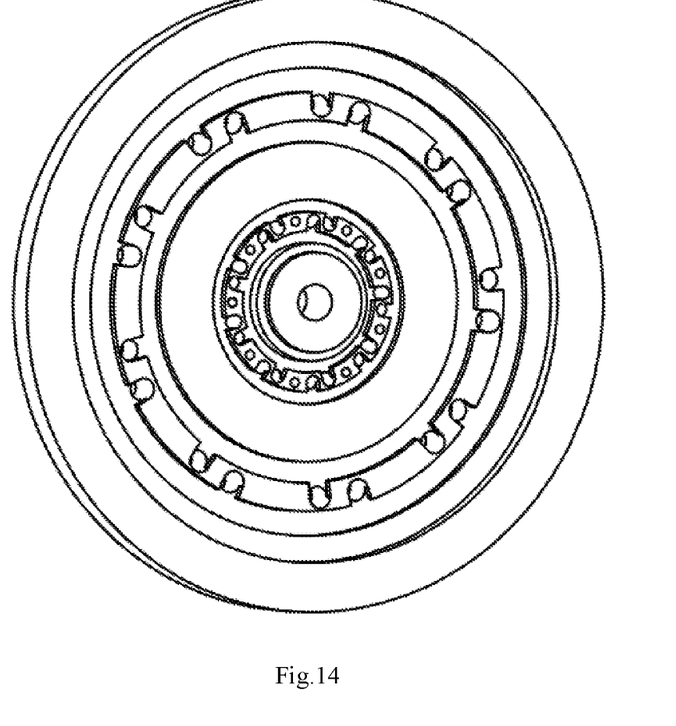
FIG. 14 is another structural diagram of the frontend cover of a new two-stator and two-rotor combined energy-saving motor in an embodiment of the present invention
Figure 15:
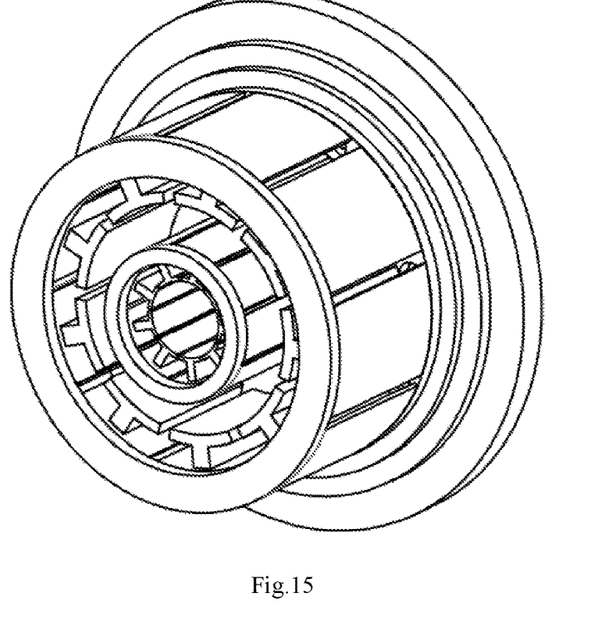
FIG. 15 is the matching diagram of the frontend cover and stator of a new two-stator and two-rotor combined energy-saving motor in an embodiment of the present invention
Figure 16:
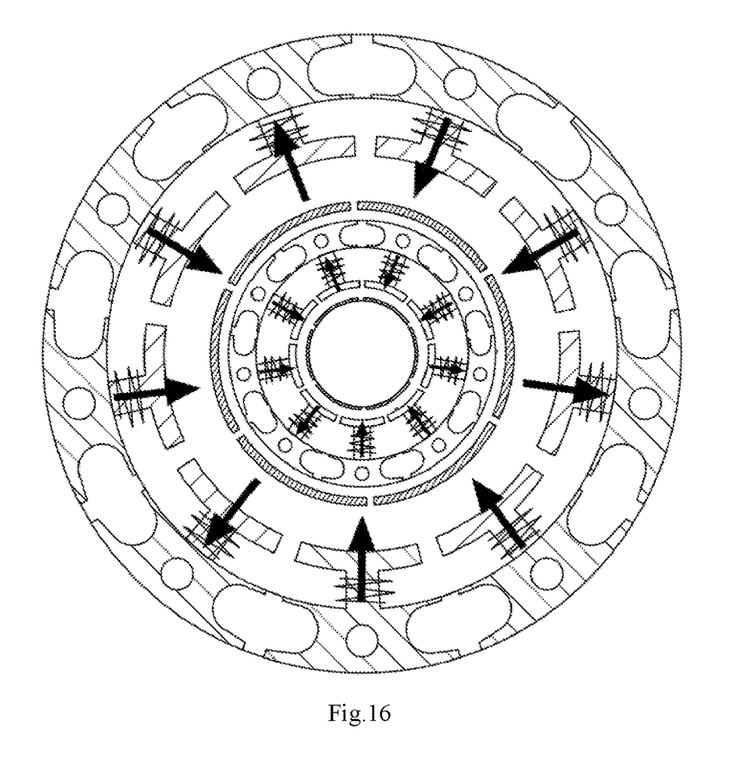
FIG. 16 is the directional diagram of the magnetic induction lines of the coil on the stator core at a certain time of a new two-stator and two-rotor combined energy-saving motor in an embodiment of the present invention.
Figure 17:
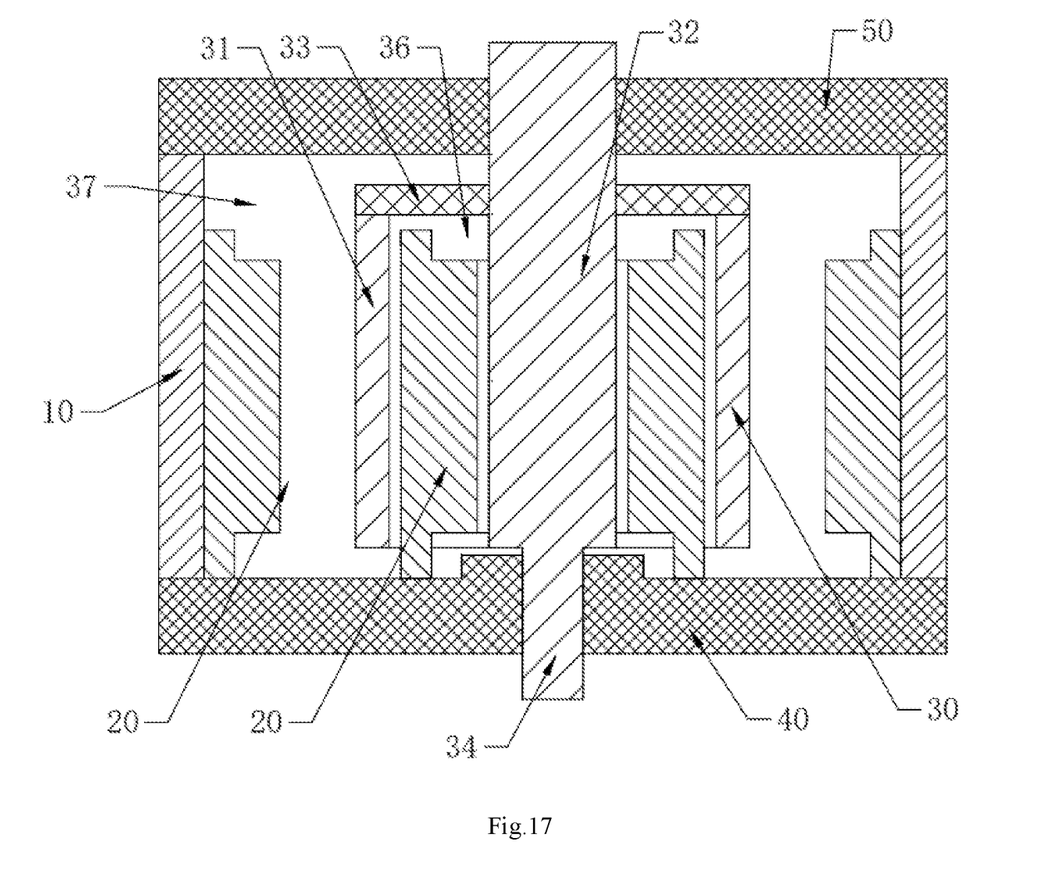
FIG. 17 is another structural view of a new two-stator and two-rotor combined energy-saving motor in an embodiment of the present invention In the drawing.

Explanation to Accompany Drawings:

FIG. 1 shows the structural relationship of stator 20 and rotor 30 from a sectional view, two stators 20 are arranged in respective stator zones. FIG. 2 shows the overall picture of motor. FIG. 3 shows the matching relationship of stator 20 and rotor 30 from a three-dimensional view. FIG. 4 shows the structural relationship of each component of stator 20 in the inner stator zone 36. FIG. 5 shows the distribution of stator cores 22 in stator 20. FIG. 6 shows the structural relationship of each component in rotor 30, the structure of the rotor of a mixed-wave motor. The permanent magnet modules 35 of the outer rotor part 31 are inclinedly mounted along the side thereof, and the permanent magnet modules 35 of the inner rotor part 32 are vertically mounted along the side thereof. FIG. 7 shows the structure of the stator in the outer stator zone from a three-dimensional view. FIG. 8 shows the structural relationship of stator 20 and rotor 30 from another sectional view. FIG. 9 shows the direction of the magnetic induction lines of the permanent magnet module 35 of the inner rotor part 32 and the outer rotor part 31 in the rotor 30. FIG. 10-12 show the structure of the rotor in different embodiments of the present invention, wherein FIG. 10 shows the structure of the rotor of a mixed-wave motor, FIG. 11 shows the structure of the rotor of a square-wave motor, and FIG. 12 shows the structure of the rotor of a sinusoidal-wave motor. FIG. 13 shows the structure of fixing support 24 for fixing stators 20 on the frontend cover 40. FIG. 14 shows the structure of frontend cover 40 in FIG. 13 from another direction. FIG. 15 shows the structure of the frontend cover 40 fixing stators 20 in FIG. 13. FIG. 16 shows the direction of the magnetic induction lines of coils 23 on stator 20 at a certain time. As a separate magnet, each coil 23 sends out magnetic induction lines to both radial sides of the stator core 22. FIG. 17 shows the sectional structure that the stators in the outer stator zone 37 are arranged on the inner surface of the motor shell 10.

The technical scheme of the present invention is further explained in combination with the accompanying drawings and through the specific implementations.

Embodiment 1

The new two-stator and two-rotor combined energy-saving motor in the embodiment comprises a motor shell 10, two rotors 30 and two stators 20, wherein the stators 20 and the rotors 30 are arranged in the motor shell 10, the stator 20 comprises a plurality of circularly distributed stator cores 22, and the stator cores 22 are wound with magnetic induction lines passing through the coils 23 at both radial sides of the stator core 22. The rotor 30 comprises an outer rotor part 31, an inner rotor part 32 and a flange 33, wherein the outer rotor part 31 is arranged outside the cylindrical inner rotor part 32, and the outer rotor part 31 and the inner rotor part 32 are connected by flange; an inner stator zone 36 is formed between the outer rotor part 31 and the inner rotor part 32, and one stator 20 is arranged in the inner stator zone 36 of the rotor 30; an outer stator zone 37 is formed between the outer rotor part 31 and the motor shell 10, and the other stator 30 is arranged in the outer stator zone 37; the inner side of the outer rotor part 31 and the outer side of the inner rotor part are provided with a plurality of circularly distributed permanent magnet modules 35, and two adjacent permanent magnet modules 35 have opposite polarity.

There are various winding modes on the stator core, and the matching mode of coil 23 and permanent magnet module 35 is the same as that of ordinary motor. In an implementation, the quantity ratio of the permanent magnet module 35 and coil 23 of outer rotor part 31 and the permanent magnet module 35 of the inner rotor part 32 is 2:3:2. The quantity ratio may change in other implementations.

Further, the outer rotor part 31 is made of a non-magnetic material so that the magnetic induction line can pass through the outer rotor part 31.

The two-stator and two-rotor combined energy-saving motor in the embodiment can be both used as a motor and a generator.

When used as a motor, the coil 23 on the stator core 22 is supplied with three-phase current, and the working process of the stator in the inner stator zone 36 is described: since the stator core 22 is made of magnetic material, after the coil 23 on the stator core 22 is energized, the magnetic induction lines of the coil 23 can pass through both radial sides of the stator core 22; meanwhile, since the outer rotor part 31 and the inner rotor part 32 are respectively arranged at both radial sides of the stator core 22; thus, the magnetic induction lines generated by the coil 23 act on the outer rotor part 31 and the inner rotor part 32 at both radial sides. Therefore, each stator core 22 forms a separate magnet and generates magnetic fields with different phases, wherein the North pole and the South pole are respectively arranged at both radial sides of the stator core 22, respectively facing towards the outer rotor part 31 and the inner rotor part 32. The direction and strength of the magnetic field generated by the coil 23 of the stator core 22 change with time, and two adjacent coils 23 of the stator core 22 have different phases.

The working process of the stator in the outer stator zone 37 is described: After three-phase current is supplied, the coil 23 of the stator core 22 generates a magnetic field, which acts on the permanent magnet module 35 of the outer rotor part 31.

When the three-phase current changes, the two stators 20 generate a rotating magnetic field respectively, which jointly drive the outer rotor part 31 and the inner rotor part 32 provided with permanent magnet module 35 to rotate; when the magnetic field of the stator core 22 changes, the two stators 20 generate a rotating magnetic field, the magnetic field of the stator 20 in the inner stator zone 36 acts on the permanent magnet module 35 of the outer rotor part 31 and the inner rotor part 32, and the magnetic field of the stator 20 in the outer stator zone 37. The rotating magnetic fields of the two stators change simultaneously, and the directions of the forces applied to the rotor 30 by the two stators 20 can be superimposed, which makes the total output power of rotor 30 equal to the sum of the power of outer rotor part 31 and inner rotor part 32.

In a further implementation, to ensure the superposition effect of the forces applied by the two stators on the rotor 30, the coils 23 of the stator cores 22 of the two stators are wound with same quantity of slots and same and symmetrical arch angle, and the windings of coils 23 at the opposite positions have same phases and magnetic induction lines with same direction, which makes the rotating magnetic field of two stators 20 change simultaneously. At this time, the magnetic fields of two stators 20 change simultaneously and have same phases, and the forces thereof applied to the rotor 30 have same direction, realizing a good superposition effect.

FIG. 9 shows the direction of the magnetic induction lines of permanent magnet module 35 in an implementation.

Particularly, when used as a motor, for the stators 20 in the inner stator zone, there are two actions that increase the output power of rotor 20.

First, as stated above, since the magnetic induction lines can pass through both radial sides of the stator core 22, the magnetic induction lines of coil 23 can be utilized fully; the rotating magnetic fields simultaneously drive the inner rotor part 32 and the outer rotor part 31 to rotate, which makes the output power of rotors 20 equal to the sum of the power of inner rotor part 32 and outer rotor part 31.

Second, within a certain angle range, the magnetic induction lines of the inner rotor part 32 can enhance the magnetic field generated on the stator core 22, thus increasing the force exerted by the magnetic field on the outer rotor part 31. Specifically, when rotor 30 rotates within a specific angle range, the stator core 22 with good magnetic permeability is affected by the magnetic induction line of rotor part 32, which generates an induced magnetic field; within the specific angle range, the induced magnetic field generated by the stator core 22 and the magnetic field generated by the coil 23 have same direction and thus are superposed, which makes the strength of the magnetic field generated by stator core 22 equal to the sum of the rotating magnetic field of coil 23 and the induced magnetic field of stator core 22; thus, the magnetic field generated by stator core 22 is enhanced, then the magnetic field acting on the outer rotor part 31 is enhanced, further enhancing the force applied to the outer rotor part 31. Similarly, within another specific angle range, the magnetic field generated by stator core 22 can also be enhanced by the magnetic induction lines of the outer rotor part 31, which further enhances the force of the magnetic field on the inner rotor part 32. In an implementation, the cycle of three-phase current is adaptively adjusted to obtain the specific angle.

The specific angle is generated under the following conditions: the induced magnetic field generated by stator core 22 under the action of permanent magnet module 35 has the same direction as that of the rotating magnetic field of the coil 23.

Taking the rotating magnetic field of coil 23 on a stator core 22 enhanced by inner rotor part 32 as an example, the occurrence of one of the specific angles is described: The direction and strength of the magnetic field on one coil 23 change with time; within a certain period of time, the coil 23 on a certain stator core 22 generates a magnetic field in one direction, and meanwhile, one permanent magnet module 35 with internal rotor part 32 generates magnetic induction lines in the direction opposite to that of the coil 23 towards the inner stator zone 36. When the permanent magnet module 35 rotates from one side of the stator core 22 to the position of the opposite stator core 22, the magnetic flux on the stator core 22 increases; thus, the stator core 22 generates an induced magnetic field opposite to the magnetic field of the permanent magnet module 35. At this time, the induced magnetic field generated has the same direction as that of the magnetic induction lines of coil 23, which further enhances the rotating magnetic field of the coil 23. In the actual situation, the magnetic field of coil 23 can be effectively enhanced with more positions meeting the occurrence conditions of this specific angle.

The above two actions coordinate with each other and increase the output power of rotor 30.

The second action stated above can also increase the force exerted on the outer rotor part 31 of stator 20 in the outer stator zone 37. Specifically, as stated above, due to the existence of the second action, the stator core 22 in the inner stator zone with the enhanced magnetic field enhances the magnetic field of the outer rotor part 31 within a specific angle range. At this time, the force applied to the outer rotor part 31 of the stator 20 in the outer stator zone 37 is increased.

Compared with the traditional motor, through the structure design of stator 20 and rotor 30, the stator 20 in the inner stator zone 36 takes each stator core 22 as a separate electromagnetic winding, thus the magnetic fields on both sides of several separate electromagnetic windings are used to drive the outer rotor part 31 and the inner rotor part 32 of rotor 30; equivalently, the magnetic fields on both sides of the stator 20 of the inner stator zone 36 are used to drive the inner rotor part 32 and the outer rotor part 31, which makes the total output power of rotor 30 equal to the sum of the output power of inner rotor part 32 and outer rotor part 31 and fully utilizes the magnetic fields on both sides of the stator 20 and the internal space of the motor, thus avoiding energy waste. The magnetic fields on both sides of the permanent magnet module 35 on the outer rotor part 31 are also utilized, the outer rotor part 31 is driven to rotate by two stators 20 respectively through the magnetic field of the permanent magnet module 35 on the outer rotor part 31, which further increases the output power of rotor 30; under the condition of realizing the same power, the magnetic fields on both sides of the outer rotor part 31 are utilized, which further improves the energy utilization efficiency and achieves the purpose of energy conservation and environmental protection compared with the traditional motor.

When used as a generator, since the stator core 22 is made of magnetic material, the magnetic induction lines of the permanent magnet module 35 of the inner rotor part 32 and the outer rotor part 31 can act on the coil 23 after passing through both radial sides of the stator core 22 of the stator 20 in the inner stator zone 36; meanwhile, the magnetic induction lines of the permanent magnet module 35 of the outer rotor part 31 can act on the coil 23 of the stator 20 in the outer stator zone 37. At this moment, the rotor 30 rotates, and the permanent magnet module 35 thereof rotates to generate a rotating magnetic field, the coils 23 on the two stators 20 generate an electromagnetic induction, generates a synchronous electromotive force and outputs electrical energy.

Compared with the traditional generator, in this embodiment, the coil 23 on the stator 20 of the inner stator zone 36 is simultaneously affected by the magnetic induction line from the permanent magnet module 35 on the outer rotor part 31 and the magnetic induction line from the permanent magnet module 35 on the inner rotor part 32, the flux of the coil 23 of the stator 20 in the inner stator zone 36 changes more, which generates higher electromotive force. Meanwhile, the stator 20 in the outer stator zone 37 is also affected by the magnetic induction lines to output higher electromotive force.

Embodiment 2

The embodiment provides a new method for fixing stators 20 for a two-stator and two-rotor combined energy-saving motor. In an implementation, FIG. 17 shows the stator core of the stator in the outer stator zone is fixed on the inner surface of the motor shell, and meanwhile, the arrangement of the stator in the outer stator zone 37 is the same as that of the traditional motor. Further, when the stator in the outer stator zone 37 is arranged on the inner surface of the motor shell 10, more than two stators can be set in the outer stator zone 37 to jointly drive the outer rotor part 31 to rotate, which realizes higher output power.

In another implementation, as shown in FIG. 5, the stators of the outer stator zone 37 and the inner stator zone 36 are fixed on the frontend cover 40. Specifically, the stator further comprises a fixing ring 21 and a fixing support 24, wherein the stator cores 22 are circularly distributed on the fixing ring 21, and the fixing support 24 is used for fixing the stator cores 22 on the fixing ring 21.

The stator core 22 in an implementation is an I-shaped structure, which comprises a first arch part 221, a second arch part 222 and a middle part 223, wherein the first arch part 221 and the second arch part 222 are connected by the middle part 223, and the coils 23 are wound on the middle part 223 with slots at both sides. The stator cores 22 of stator 20 in the inner stator zone 36 are configured as follows: the first arch part 221 faces towards the outer rotor part 31, and the second arch part 222 faces towards the inner rotor part 32.

In an implementation, when the stator in the outer rotor zone 37 and the stator in the inner rotor zone 36 are fixed on the frontend cover 40, the stator cores 22 of the stator 20 in the outer stator zone are configured as follows: the second arch part 222 faces towards the outer rotor part 31.

In a further implementation, a fixing hole 224 of the first arch part 221 vertically runs through the first arch part 221, and the fixing support 24 is fixedly connected to the fixing ring 21 after passing through the fixing hole 224, to maintain the relative position between the stator cores 22.

Preferably two fixing rings 21 can be set, between which the stator cores 22 are fixed; one end of the fixing support 24 penetrates and enters the fixing hole 224 from the fixing ring 21 at one side, and extends towards the other fixing ring 21 along the fixing hole 224 to fixedly connect the other fixing ring 21. Further, the other end of the fixing support 24 is fixed to the frontend cover 40, the frontend cover 40 corresponds to the backend cover 50, and they are arranged at both sides of the motor shell 10 respectively.

Embodiment 3

The embodiment provides a new two-stator and two-rotor mixed-wave combined energy-saving motor capable of generating mixed waves, as shown in FIG. 6. FIG. 6 shows the structure of the rotor of a mixed-wave motor, wherein each permanent magnet module 35 comprises a plurality of permanent magnets, the permanent magnets of the permanent magnet module 35 of the inner rotor part 32 are vertically mounted along the outer side of the inner rotor part, and the permanent magnets of the permanent magnet module 35 of the outer rotor part 31 are inclinedly mounted along the inner side of the outer rotor part. Or, FIG. 10 shows the structure of the rotor of another mixed-wave motor, wherein the permanent magnets of the permanent magnet module 35 of the inner rotor part 32 are inclinedly mounted along the outer side of the inner rotor part, and the permanent magnets of the permanent magnet module 35 of the outer rotor part 31 are vertically mounted along the inner side of the outer rotor part.

When used as a motor, the working process in this embodiment is similar to that of the above embodiment 1.

When this embodiment is used as a generator, particularly the inclinedly mounted permanent magnet module 35 enables stator 20 to generate sinusoidal alternating current; meanwhile, the vertically mounted permanent magnet module 35 enables stator 20 to generate square-wave alternating current. Therefore, the stator 20 can generate sinusoidal-and-square mixed waves, which realizes the output of mixed waves. According to the need, the waveform of alternating current can be selected adaptively to make it suitable for practical application.

In this embodiment, since the output waveform is a mixed wave of sinusoidal wave combined with square wave, the sinusoidal wave controller or square wave controller can be selected when selecting the controller, which improves the applicability of the motor.

Further, the angle of inclination of the permanent magnets inclinedly mounted is 5 to 15 degrees, to be 10 degrees preferably. As shown in FIG. 6 and FIG. 10, the angle of inclination of the permanent magnets inclinedly mounted is 10 degrees.

Further, the permanent magnet modules 35 of the inner rotor part 32 and the outer rotor part 31 have same quantity, and the permanent magnet modules 35 have same quantity of permanent magnets.

Embodiment 4

The embodiment provides a new two-stator and two-rotor combined energy saving motor capable of generating sinusoidal or square waves. As shown in FIG. 11 and FIG. 12, the permanent magnet modules 35 of the inner rotor part 32 and the outer rotor part 31 have opposite positions and same quantity, and the permanent magnet modules 35 at the opposite positions of the inner rotor part 32 and the outer rotor part 31 have opposite polarity facing towards the inner stator zone.

In this embodiment, when used as an electric motor, the output power of rotor 30 can be further increased for the following reasons:

Since the permanent magnet modules 35 at the opposite positions of the outer rotor part 31 and the inner rotor part 32 have opposite polarity, the magnetic induction lines of the permanent magnet modules 35 of the outer rotor art 31 and the inner rotor part 32 are mutually constrained, and thus most of the magnetic induction lines of the permanent magnet modules 35 are constrained between the opposite permanent magnet modules 35, which makes the magnetic induction lines in the inner stator zone 36 more concentrated and the magnetic field stronger. Thus, when the coil 23 is energized and generates a rotating magnetic field, the force of the rotating magnetic field on the permanent magnet modules 35 at both inner and outer sides is increased, which further increases the output power of rotor.

Particularly, an inner rotor motor is formed by the outer rotor part 31 and the stator in the outer stator zone 37. Compared with existing inner rotor motors, the inner rotor motor formed by the outer rotor part 31 and the stator in the outer rotor zone in the embodiment realizes higher output power for the following reasons:

Due to the existence of stator 20 in inner stator zone 36 and the opposite polarity of permanent magnet modules 35 on outer rotor part 31 and inner rotor part 32, the magnetic induction lines of permanent magnet modules 35 on outer rotor part 31 and inner rotor part 32 are attracted by the iron stator 20, thus the magnetic induction lines from the permanent magnet module 35 on the inner rotor part 32 can be extended to the outer rotor part 31 after passing the stator of the inner stator zone 36, which enhances the magnetic field of the outer rotor part 31 towards the side of the outer stator zone 37; as a result, the stator 20 in the outer stator zone 37 can generate stronger driving force to the outer rotor part 31, which enhances the overall output power of the motor.

When used as a generator, it is similar as a motor. There is also the situation that the magnetic induction lines are constrained mutually, leading to the accumulation of magnetic induction lines, and then the power of the generator is enhanced. Similarly, the internal rotor motor formed by the outer rotor part 31 and the stator in the outer stator zone 37 is strengthened by the stator 20 in the inner stator zone 36; compared with the ordinary internal rotor motor, it can generate more alternating current, and the outer rotor part 31 generates alternating current with the inner stator 36, and the inner rotor part 32 generates alternating current with the inner stator 36, which improves the output efficiency.

Referring to FIG. 12, a further embodiment shows the structure of the rotor of a sinusoidal-wave motor, wherein the permanent magnet modules 35 of the inner rotor part 32 and the permanent magnets of the permanent magnet module 35 of the outer rotor part 33 are inclinedly mounted along the opposite sides thereof, and preferably the angle of inclination of the permanent magnets thereof are the same.

An embodiment shows that the angle of inclination of the inclinedly mounted permanent magnets of the permanent magnet module 35 is 5 to 15 degrees, preferably to be 10 degrees. As shown in FIG. 12, the angle of inclination of the permanent magnets is 10 degrees.

The working process of this embodiment when used as an electric motor is similar as the above. When used a generator, the superimposed sinusoidal alternating current is generated, and the angle of inclination of the permanent magnets of the inclined permanent magnet module 35 affects the waveform of the sinusoidal wave generated by stator 20.

According to the actual application, choose the angle of inclination reasonably.

Referring to FIG. 11, another further embodiment shows the structure of the rotor of a square-wave motor, wherein the permanent magnets of the permanent magnet module 35 of the inner rotor part are vertically mounted along the outer side of the inner rotor part, and the permanent magnets of the permanent magnet module 35 of the outer rotor part are vertically mounted along the inner side of the outer rotor part.

When used as an electric motor, this embodiment is similar as the above process. When used as a generator, this embodiment generates square-wave alternating current.

When the permanent magnet modules 35 are vertically mounted, this embodiment can be used as a damping motor. When used as a damping motor, the permanent magnet modules 35 on the inner side of the outer rotor part 31 and the outer side of the inner rotor part 32 have opposite positions and the magnetic field in the same direction. At this time, due to the opposite positions, the magnetic fields of the permanent magnet modules 35 of the inner rotor part 32 can be directly superposed with those of the permanent magnet modules 35 of the outer rotor part 31, which makes the magnetic field acting on the stator 20 larger than that of one inclined permanent magnet. When the rotor 30 rotates, especially between two permanent magnet modules 35 of the stator 20 in the inner stator zone 36, the flux of the coil 23 of the stator 20 changes from facing one side to facing the other, and the number changes greatly, which makes the stator 20 generate an enormous induced electromotive force and impedes further rotation of rotor 30.

Similarly, in this embodiment, since the two parts of permanent magnet modules 35 can be superposed, compared with the traditional damping motor, the induced electromotive force generated on stator 20 is larger and the damping effect is better.

Embodiment 5

This embodiment provides a method for configuring the rotating shaft of a new two-stator and two-rotor combined energy-saving motor, which further comprises a rotating shaft 34, wherein the rotating shaft 34 is connected to the inner rotor part, the rotating shaft 34 is also connected to the frontend cover 40 through rotation of a bearing after passing through the frontend cover, and the stators 20 are fixedly mounted on the frontend cover 40.

When both vertical sides of the stator core 22 are provided with a fixing ring 21, a hole for the fixing support 24 is provided on a fixing ring 21 facing the frontend cover 40, and the fixing support 24 passes through the hole and enters the fixing hole 224 of the stator core 22, extended towards and fixed on the fixing ring 21 of stator core 22 far from the frontend cover 40.

In this embodiment, a water-cooled heat dissipation structure can be set to dissipate heat from stator 20, whose specific structure is similar as that disclosed by CN204012958U.

The present invention is described by preferred embodiments and is known to the technical personnel in the field that, without deviating from the spirit and scope of the present invention, various changes or equivalent substitutions may be made to these characteristics and embodiments. The present invention shall not be restricted by the specific embodiments disclosed herein, and other embodiments falling within the claims of this application shall fall within the scope of protection of the invention.

The invention claimed is:

1. A new two-stator energy-saving motor, comprises a motor shell, a rotor and two stators, wherein the stators and the rotor are arranged in the motor shell;
   wherein each stator comprises a plurality of circularly distributed stator cores, and the stator cores are wound with magnetic induction lines passing through the coils at both radial sides of the stator core;
   wherein the rotor comprises an outer rotor part, an inner rotor part and a flange, wherein the outer rotor part is arranged outside the inner rotor part, and the outer rotor part and the inner rotor part are connected by the flange;
   an inner stator zone is formed between the outer rotor part and the inner rotor part, and one of the stators is arranged in the inner stator zone of the rotor; an outer stator zone is formed between the outer rotor part and the motor shell, and the other of the stator is arranged in the outer stator zone;
   the inner side of the outer rotor part and the outer side of the inner rotor part are provided with a plurality of circularly distributed permanent magnet modules, and two adjacent permanent magnet modules have opposite polarity,
   wherein each permanent magnet module comprises a plurality of permanent magnets,
   wherein the permanent magnets of each permanent magnet module of the outer rotor part are mounted on the inner side of the outer rotor part along a circumferential direction of the outer rotor part,
   wherein each of the permanent magnets is offset by a substantial distance at the circumferential direction from another axially adjacent one of the permanent magnets, and
   wherein either:
   the permanent magnets of the permanent magnet module of the inner rotor part are vertically mounted along the outer side of the inner rotor part; the permanent magnets of the permanent magnet module of the outer rotor part are inclinedly mounted along the inner side of the outer rotor part;
   or, wherein the permanent magnets of the permanent magnet module of the inner rotor part are inclinedly mounted along the outer side of the inner rotor part; the permanent magnets of the permanent magnet module of the outer rotor part are vertically mounted along the inner side of the outer rotor part.

2. The two-stator energy-saving motor according to claim 1 is characterized in that the stator cores of the stator in the outer stator zone are fixed on the inner surface of the motor shell.

3. The two-stator energy-saving motor according to claim 1 is characterized in that each stator further comprises a fixing ring and the stator cores are circularly distributed on the fixing ring: wherein each of the stators further comprises a fixing support, to fix the stator cores onto the fixing ring:
   the stator cores, in an I-shaped structure, comprising a first arch part, a second arch part and a middle part; the middle part, connecting the first arch part and the second arch part, and the coils are wound on the middle part with slots at both sides;
   a fixing hole of the first arch part, vertically running through the first arch part; the fixing support, fixedly connected to the fixing ring after passing through the fixing hole;
   the stator cores of the stator, which are arranged in the inner stator zone, are configured as: the first arch part, facing towards the outer rotor part; the second arch part, facing towards the inner rotor part.

4. The new two-stator energy-saving motor according to claim 1 is characterized in that the angle of inclination of the permanent magnets inclinedly mounted is 5 to 15 degrees.

5. The two-stator energy-saving motor according to claim 1 is characterized in that the motor further comprises a rotating shaft, connected to the inner rotor part, connected to a frontend cover by a bearing for rotation and after passing through the frontend cover; the frontend cover is provided with the stators.

* * * * *